United States Patent
Dillard et al.

(10) Patent No.: US 9,194,237 B2
(45) Date of Patent: Nov. 24, 2015

(54) SERPENTINE COOLING OF NOZZLE ENDWALL

(75) Inventors: Daniel Jackson Dillard, Greenville, SC (US); Christopher Donald Porter, Mauldin, SC (US)

(73) Assignee: General Electric Company, Schenectady, NY (US)

(*) Notice: Subject to any disclaimer, the term of this patent is extended or adjusted under 35 U.S.C. 154(b) by 426 days.

(21) Appl. No.: 13/608,269

(22) Filed: Sep. 10, 2012

(65) Prior Publication Data

US 2014/0072400 A1    Mar. 13, 2014

(51) Int. Cl.
*F01D 5/18* (2006.01)

(52) U.S. Cl.
CPC ............ *F01D 5/187* (2013.01); *F05D 2240/81* (2013.01); *F05D 2250/185* (2013.01); *F05D 2260/201* (2013.01); *F05D 2260/204* (2013.01); *Y02T 50/676* (2013.01)

(58) Field of Classification Search
CPC .......... F05D 2240/81; F05D 2250/185; F05D 2260/204; F05D 2260/205; F05D 2260/201; F01D 5/187; F01D 5/188; F01D 5/189
USPC .............................. 415/115; 416/96 R, 97 R
See application file for complete search history.

(56) References Cited

U.S. PATENT DOCUMENTS

| | | | |
|---|---|---|---|
| 5,609,466 A | 3/1997 | North et al. | |
| 5,954,475 A * | 9/1999 | Matsuura et al. | 415/115 |
| 6,089,822 A | 7/2000 | Fukuno | |
| 6,254,333 B1 | 7/2001 | Merry | |
| 7,416,391 B2 * | 8/2008 | Veltre et al. | 416/97 R |
| 8,061,979 B1 * | 11/2011 | Liang | 415/173.1 |
| 8,221,055 B1 * | 7/2012 | Liang | 415/115 |
| 2010/0143154 A1 * | 6/2010 | Abba et al. | 416/97 R |
| 2010/0183428 A1 * | 7/2010 | Liang | 415/115 |
| 2010/0239432 A1 * | 9/2010 | Liang | 416/97 R |

* cited by examiner

*Primary Examiner* — Dwayne J White
*Assistant Examiner* — William Grigos
(74) *Attorney, Agent, or Firm* — Ernest G. Cusick; Frank A. Landgraff

(57) ABSTRACT

A gas turbine nozzle section of a gas turbine may include an inner endwall with a leading edge. A serpentine passage may be configured substantially within the leading edge. The serpentine passage may have an inlet and an outlet. Air may be received at the inlet and exhausted at the outlet, cooling the leading edge.

5 Claims, 3 Drawing Sheets

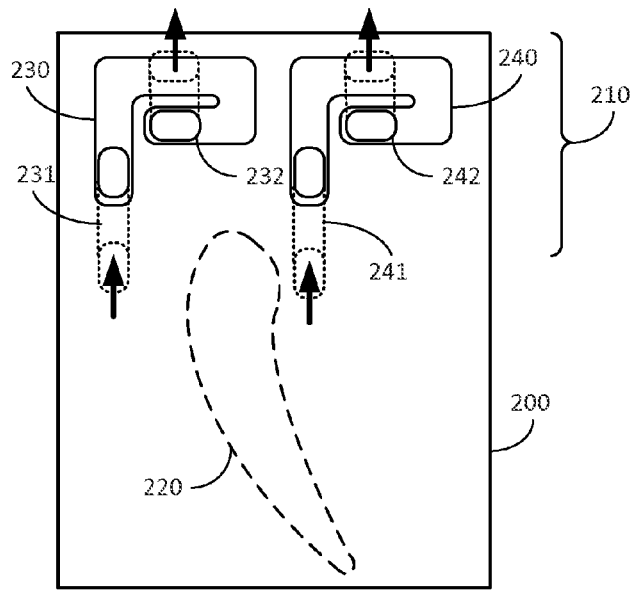
Figure 2
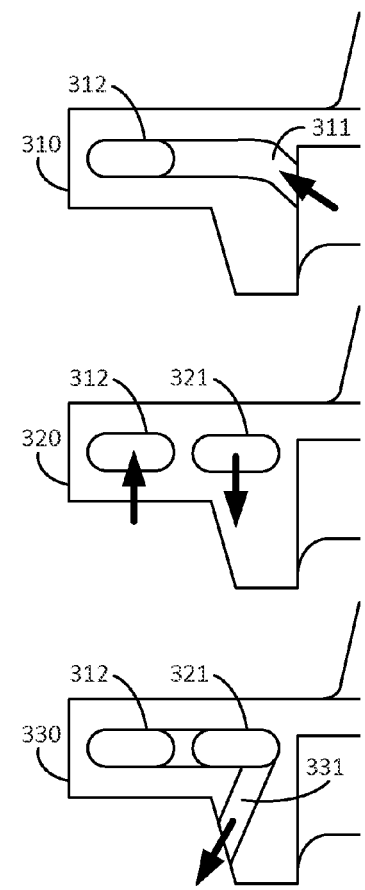
Figure 3
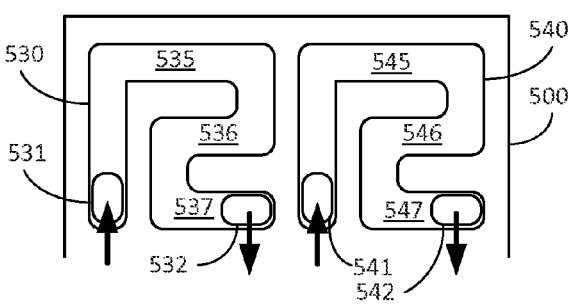
Figure 4
Figure 5

SERPENTINE COOLING OF NOZZLE ENDWALL

TECHNICAL FIELD

The present disclosure relates to gas turbines generally and in particular to methods and systems for cooling a leading edge of a nozzle in a gas turbine.

BACKGROUND

Gas turbines, which may also be referred to as combustion turbines, are internal combustion engines that accelerate gases, forcing the gases into a combustion chamber where heat is added to increase the volume of the gases. The expanded gases are then directed towards a turbine to extract the energy generated by the expanded gases. Gas turbines have many practical applications, including use as jet engines and in industrial power generation systems.

Among the components of a gas turbine may be one or more nozzles that may direct and accelerate a flow of gases toward turbine blades (may also be referred to as "buckets") to cause the blades to rotate about an axis at the center of the gas turbine. Such nozzles may be stationary and in the form of an airfoil that extends radially between an outer endwall and inner endwall of a gas turbine. Hot gases may flow through a path that is formed by the outer and inner endwalls and the airfoil walls. A leading edge of each endwall may form an overhang that extends upstream from each such airfoil. As will be appreciated, this leading edge and the endwalls can reach very high temperatures, and overheating may affect turbine performance. Therefore, measures are often taken to cool these sections of a gas turbine. While the central portion of the endwall can be cooled by impingement, the leading edge portion of a nozzle airfoil endwall may overlap portions of a turbine blade by design (e.g., a turbine blade "angel wing") in order to prevent gases from flowing through the space under the leading edge. This leading edge overhang configuration of a nozzle endwall may be particularly difficult to cool. This portion may also be subject to particularly high temperatures and stresses as the blade portions directly proximate to the leading edge portion of a nozzle airfoil may on occasion rub the leading edge. An impingement plate design is not well suited to cool this portion as it will not typically be robust enough to endure contact between the blade and the nozzle airfoil endwall.

BRIEF DESCRIPTION OF THE INVENTION

In an exemplary non-limiting embodiment, a gas turbine nozzle section may include an inner endwall that includes a leading edge. A serpentine passage may be configured substantially within the leading edge. The serpentine passage may include an inlet and an outlet, where air is received at the inlet and exhausted at the outlet to cool the leading edge.

In another exemplary non-limiting embodiment, a method is disclosed for cooling a gas turbine nozzle section by receiving air at an inlet of a serpentine passage configured substantially within a leading edge of an inner endwall of the gas turbine nozzle section, passing the air through the serpentine passage, and exhausting the air at an outlet of the serpentine passage.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein:

FIG. 2 is a top view of a cross-section of a non-limiting exemplary nozzle portion of a gas turbine.

FIG. 3 is a side view of three cross-sections of a non-limiting exemplary gas turbine nozzle leading edge.

FIG. 4 is a top view of a cross-section of a non-limiting exemplary gas turbine nozzle leading edge.

FIG. 5 is a top view of a cross-section of another non-limiting exemplary gas turbine nozzle leading edge.

DETAILED DESCRIPTION OF THE INVENTION

Figure 1:
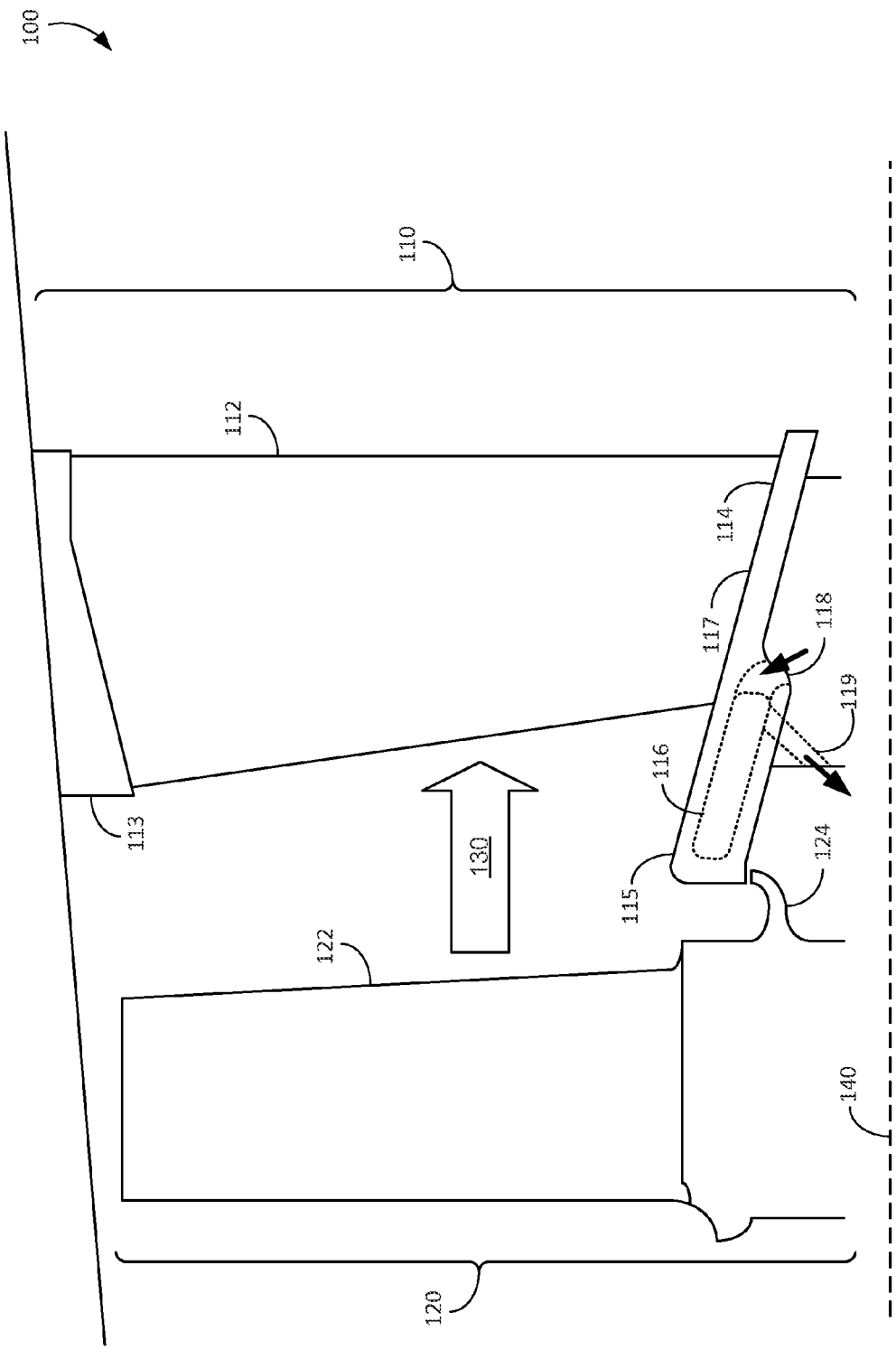
FIG. 1 is a side view of a cross-section of a non-limiting exemplary nozzle and turbine blade portion of a gas turbine.

FIG. 1 illustrates non-limiting exemplary portion 100 of a gas turbine that includes a nozzle section and a blade section, shown in a cross-sectional side view. Note that FIG. 1 is a simplified diagram of a portion of a gas turbine set forth for explanatory purposes, and omits many components and systems that may be present in a gas turbine according to any of the embodiments set forth herein. As one skilled in the art will recognize, the presently disclosed embodiments may be implemented in a wide variety of gas turbines of any type and configuration. All such embodiments are contemplated as within the scope of the present disclosure.

Portion 100 may include turbine blade 120 that may include airfoil 122. Turbine blade 120 may rotate about axis 140. Portion 100 may also include nozzle section 110, which may be stationary and include outer endwall 113 and inner endwall 114. Between and connected to endwalls 113 and 114 may be airfoil 112. Inner endwall 114 may include leading edge 115 that is upstream from airfoil 112. Airflow within portion 100 may flow in direction 130, passing over and through blade 120 and then over and through nozzle section 110.

In order to minimize the flow of gases through the space under leading edge 115, turbine blade 120 may include section 124 (e.g., an "angel wing") designed to create a seal between turbine blade 120 and nozzle section 110. While central portion 117 of inner endwall 114 may be cooled by impingement as air flows past airfoil 112, leading edge 115 of a nozzle section 110 may be difficult to cool. Accordingly, in an embodiment, one or more passages 116 may be constructed substantially within leading edge 115 to receive air at passage inlet 118 after such air has provided impingement cooling of central portion 117 of inner endwall 114 (air flow direction indicated by arrows in FIG. 1). The air received via inlet 118 may cool leading edge 115 by passing through passages 116. Passages 116 may be constructed such that the air is exhausted into the wheel space of gas turbine portion 100 via passage outlet 119 after passing through passages 116. Note that any configuration, design, and number and location of inlets and outlets of passages such as passages 116 are contemplated as within the scope of the present disclosure.

FIG. 2 illustrates a cross-sectional top view of nozzle section 200, including leading edge 210, according to an embodiment. Note that FIGS. 2-9 are not shown to scale and those sections for which description is provided are shown in more detail. A pair of passages 230 and 240 is configured in leading edge 210. Airfoil 220 is shown in dashed lines to provide a reference for the location of the passages and orientation of nozzle section 200. As can be seen in this figure, passages 230 and 240 are within leading edge 210. Note that while FIG. 2 illustrates a single airfoil for exemplary purposes, multiple airfoils may be present in any nozzle section in which any of the present embodiments may be implemented, and all such embodiments are contemplated as within the scope of the present disclosure.

In an embodiment, passages 230 and 240 may be substantially the same size and shape, and may be serpentine with a first pass of the serpentine passage running along the front edge or outermost portion of leading edge 210, i.e., farthest from airfoil 220, and then a second pass of the serpentine passage running closer to the location of airfoil 220. In this way, the leading edge portion may be cooled by the passages. The first and second passes may be connected by other passes to create the entirety of serpentine passages 230 and 240, as shown in FIG. 2. For example, air may enter each of passages 230 and 240 via inlet passes 231 and 241, respectively (arrows indicating airflow shown in FIG. 2), pass through the passages of passages 230 and 240, and then exit at outlet passes 232 and 242 of passages 230 and 240, respectively. The air received at inlet passes 231 and 241 may be received from an impingement cooling area of a nozzle section or from an impingement area of an endwall. Alternatively, the air received at the inlets may be received from any other section of a gas turbine, including from an airfoil impingement cooling area and a non-impingement area. Note that outlets, inlets and their associated passes may be located at any location of leading edge 210 or elsewhere in nozzle section 200, and multiple outlets and/or inlets per passage are contemplated as within the scope of the present disclosure. For example, as shown in FIG. 2, an inlet may be positioned towards the airfoil portion of a nozzle section (for other examples, see also FIG. 1, inlet 118 and FIG. 3, inlet 311) and configured to accept endwall post-impingement air, while an outlet may be positioned towards the wheel space (for other examples, see also FIG. 1, outlet 119 and FIG. 3, outlet 331). Note also that in some embodiments, passages 230 and 240 may be interconnected, while in other embodiments, passages 230 and 240 may not be interconnected.

FIG. 3 illustrates three cross-sectional side views of a leading edge with a serpentine passage such as, for example, that shown in FIG. 2. Section 310 shows a cross-sectional side view of the inlet portion of the serpentine passage, where inlet 311 allows air to enter the passage and flow to the outermost portion of the leading edge through passage portion 312. Section 320 shows a cross-sectional side view of a middle portion of the serpentine passage, where air flows through passage portion 312 to passage portion 321 that is closer to the airfoil section of the nozzle section than passage portion 312. Section 330 shows a cross-sectional side view of the outlet portion of the serpentine passage, where outlet 331 exhausts air flowing from passage portion 321 through outlet 331 to the wheel space of the turbine. As can be seen in this figure, an outlet may be at a side or bottom portion of a leading edge so that air may be exhausted into the wheel space of a turbine, and an inlet may be at a side of the leading edge in an area proximate to an impingement cooled section of a nozzle section. In other embodiments, the outlet and/or inlet may each be located elsewhere, and all such embodiments are contemplated as within the scope of the present disclosure.

FIGS. 4-9 illustrate alternate exemplary embodiments of serpentine passages that may be used to cool a leading edge of a nozzle section of a gas turbine. Note that in these and any other embodiments described herein, such passages may be of any shape, size, quantity, orientation, configuration, and all such embodiments are contemplated as within the scope of the present disclosure.

FIG. 4 illustrates an embodiment where the passages are approximately the same shape as those of FIG. 2, but with different passage sizes. Note that in FIGS. 4-9, only the leading edge portion of an inner endwall of a gas turbine nozzle section is shown so as to provide a clear explanation of the contemplated embodiments.

In FIG. 4, leading edge 400 may have serpentine passages 430 and 440 each with a first pass of the serpentine passage running along the outermost, i.e., farthest from an airfoil proximate to leading edge 400, portion of leading edge 400, and then a second pass of the serpentine passage running closer to the location of an associated airfoil. In this embodiment, the internal diameter, or width, of the passage may vary. For example, widths 433 and 443 of the first pass of passages 430 and 440, respectively, may be smaller than widths 434 and 444 of the second pass of passages 430 and 440, respectively. Alternatively, in another embodiment the width of a first pass may be larger than that of a second pass of a passage. Any width, diameter, dimensions, and variations thereof of any passage are contemplated as within the scope of the present disclosure. Similar to the passages of FIG. 2, leading edge 400 may be cooled by passages 430 and 440, when air enters each of passages 430 and 440 via inlets 431 and 441, respectively (arrows indicating airflow shown in FIG. 4, complete inlet pass and outlet pass (as seen in FIG. 2) not shown for clarity), pass through the passages, and then exit at outlets 432 and 442 of passages 430 and 440, respectively. Note that, as with all embodiments disclosed herein, the outlets and inlets may be located at any location of a leading edge or elsewhere in a nozzle section, and multiple outlets and/or inlets per passage are contemplated as within the scope of the present disclosure.

FIG. 5 illustrates non-limiting exemplary leading edge 500 that may have serpentine passages 530 and 540 each with more than two passes, unlike the embodiment illustrated in FIGS. 2 and 4. First passes 535 and 545 of passages 530 and 540, respectively, may run along the outermost portion of leading edge 500. i.e., farthest from an airfoil proximate to leading edge 500, second passes 536 and 546 of passages 530 and 540, respectively, may then be centrally located between the two other passes, with third passes 537 and 547 of passages 530 and 540, respectively, running closest to the location of an associated airfoil. In this embodiment as with all others disclosed herein, the internal diameter, or width, of the passage may vary. Any number of passes and configurations of such passes are contemplated as within the scope of the present disclosure. By using more passes per passage configured in leading edge 500, leading edge 500 may be more easily and thoroughly cooled by passages 530 and 540 when air enters each of passages 530 and 540 via inlets 531 and 541, respectively (arrows indicating airflow shown in FIG. 5), pass through the passages, and then exit at outlets 532 and 542 of passages 530 and 540, respectively. Note that, as with all embodiments disclosed herein, the outlets and inlets may be located at any location of a leading edge or elsewhere in a nozzle section, and multiple outlets and/or inlets per passage are contemplated as within the scope of the present disclosure.

Figure 6:
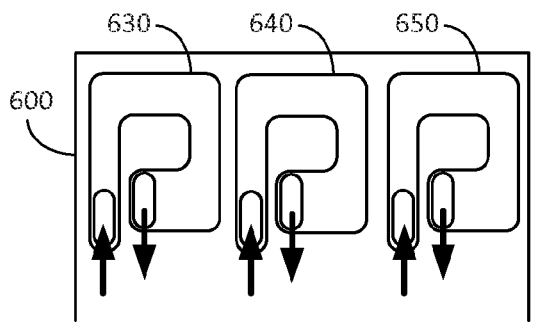
FIG. 6 is a top view of a cross-section of another non-limiting exemplary gas turbine nozzle leading edge.

FIG. 6 illustrates non-limiting exemplary leading edge 600 that may have more than two serpentine passages, illustrating that any number of passages is contemplated as within the scope of the present disclosure. In the illustrated embodiment, three passages 630, 640, and 650 may each be configured in leading edge 600, and may each have any number of passes, each of which may have any internal diameter, or width. Any number of passes and configurations of such passes for each of passages 630, 640, and 650 are contemplated as within the scope of the present disclosure. By using more passages in leading edge 600, leading edge 600 may be more easily and thoroughly cooled (arrows indicating airflow shown in FIG. 6).

Figure 7:
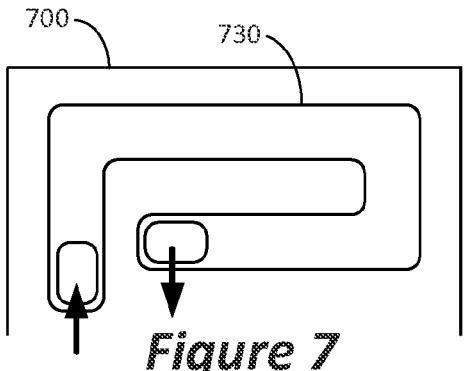
FIG. 7 is a top view of a cross-section of another non-limiting exemplary gas turbine nozzle leading edge.

Rather than multiple passages, in an embodiment, a single, and optionally longer, passage may be used in a leading edge. FIG. 7 illustrates such an embodiment. Leading edge 700 may have single passage 730 that may have any number of passes, each of which may have any internal diameter, or width. Any number of passes and configurations of such passes for passage 730 are contemplated as within the scope of the present disclosure. By using a single and optionally larger passage in leading edge 700, passage 730 may thoroughly cool leading edge 700 (arrows indicating airflow shown in FIG. 7).

Figure 8:
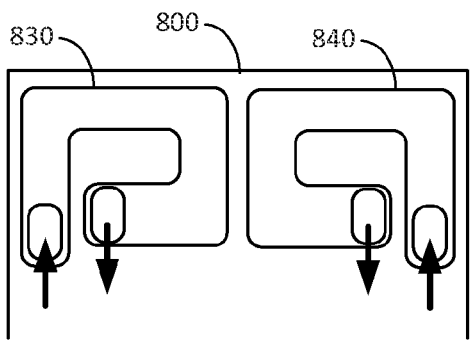
FIG. 8 is a top view of a cross-section of another non-limiting exemplary gas turbine nozzle leading edge.
Figure 9:
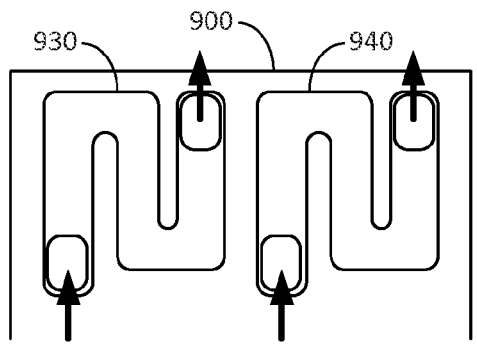
FIG. 9 is a top view of a cross-section of another non-limiting exemplary gas turbine nozzle leading edge.

Any orientation of passages, relative to each other and/or any other portion of a nozzle section of a gas turbine, is contemplated as within the scope of the present disclosure. For example, as shown in FIG. 8, each of passages 830 and 840 in leading edge 800 may be oriented on a mirror image orientation. In another example, shown in FIG. 9, each of passages 930 and 940 in leading edge 900 is constructed such that the longer passes of the passages are substantially perpendicular to the front (i.e., portion further from an associated airfoil) of the leading edge, rather than substantially parallel to the front of a leading edge, as in, for example, FIGS. 4, 7, and 8.

The technical effect of the systems and methods set forth herein is improved cooling of a leading edge section of a gas turbine nozzle by using impingement cooling air. As will be appreciated by those skilled in the art, the use of the disclosed processes and systems may reduce the temperature or required cooling flow at a significant gas turbine component, and therefore improve the performance and the lifespan of the component. Manufacture of the disclosed embodiments may also eliminate some post-casting operations, which may result in cost savings. Those skilled in the art will recognize that the disclosed endwall cooling systems and methods may be combined with other cooling systems and technologies in order to achieve even greater temperature or cooling flow reduction. All such embodiments are contemplated as within the scope of the present disclosure.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of cooling a gas turbine nozzle section comprising:
    receiving air at an inlet of a first serpentine passage configured substantially within a leading edge of an inner endwall of the gas turbine nozzle section, the receiving further comprising receiving the air from an impingement cooling section of a gas turbine;
    passing the air through the serpentine passage; and
    exhausting the air at an outlet of the serpentine passage; further comprising:
    receiving second air at a second inlet of a second serpentine passage configured substantially within the leading edge of the inner endwall of the gas turbine nozzle section;
    passing the second air through the second serpentine passage; and
    exhausting the second air at a second outlet of the second serpentine passage.

2. The method of claim 1, wherein the serpentine passage and the second serpentine passage are not interconnected.

3. The method of claim 1, wherein the serpentine passage and the second serpentine passage are substantially the same size and shape.

4. The method of claim 1, wherein the serpentine passage and the second serpentine passage are configured in a substantially mirror image orientation.

5. The method of claim 1, wherein the serpentine passage is oriented substantially perpendicular to an airfoil of the gas turbine nozzle section.

* * * * *